(12) United States Patent
Shin et al.

(10) Patent No.: US 12,720,083 B2
(45) Date of Patent: Aug. 25, 2026

(54) APPARATUS AND METHOD FOR IMPLICIT NEURAL VIDEO REPRESENTATION

(71) Applicant: SAMSUNG ELECTRONICS CO., LTD., Suwon-si (KR)

(72) Inventors: Seung Jun Shin, Suwon-si (KR); Su Ji Kim, Suwon-si (KR); Young Hun Sung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/679,066

(22) Filed: May 30, 2024

(65) Prior Publication Data

US 2024/0414358 A1 Dec. 12, 2024

(30) Foreign Application Priority Data

Jun. 7, 2023 (KR) ........................ 10-2023-0073161

(51) Int. Cl.

*H04N 19/186* (2014.01)
*H04N 19/103* (2014.01)
*H04N 19/119* (2014.01)
*H04N 19/177* (2014.01)
*H04N 19/42* (2014.01)

(52) U.S. Cl.

CPC ......... *H04N 19/186* (2014.11); *H04N 19/103* (2014.11); *H04N 19/119* (2014.11); *H04N 19/177* (2014.11); *H04N 19/42* (2014.11)

(58) Field of Classification Search

None

See application file for complete search history.

(56) References Cited

U.S. PATENT DOCUMENTS

| | | | | |
|---|---|---|---|---|
| 10,580,148 | B2 | 3/2020 | Windmark et al. | |
| 10,812,825 | B2 | 10/2020 | Liu et al. | |
| 11,361,546 | B2 | 6/2022 | Carreira et al. | |
| 11,568,682 | B2 | 1/2023 | Tang et al. | |
| 2018/0249172 | A1 | 8/2018 | Chen et al. | |
| 2022/0014776 | A1* | 1/2022 | Sethuraman | H04N 19/513 |
| 2022/0385907 | A1* | 12/2022 | Zhang | H04N 19/172 |

FOREIGN PATENT DOCUMENTS

KR 10-2021-0116872 A 9/2021

OTHER PUBLICATIONS

Z. Chen et al., "VideoINR: Learning Video Implicit Neural Representation for Continuous Space-Time Super-Resolution," 2022 IEEE/CVF Conference on Computer Vision and Pattern Recognition (CVPR), New Orleans, LA, USA, 2022, pp. 2037-2047, doi: 10.1109/CVPR52688.2022.00209. (Year: 2022).*

(Continued)

*Primary Examiner* — Kaitlin A Retallick
(74) *Attorney, Agent, or Firm* — Sughrue Mion, PLLC

(57) ABSTRACT

An apparatus for implicit neural video representation is provided. The apparatus for implicit neural video representation includes: a first neural network configured to output pixel-to-pixel matching information up to a keyframe by using space-time coordinates of a video as input; and a second neural network configured to output Red-Green-Blue (RGB) data by using the space-time coordinates and the output pixel-to-pixel matching information as input.

18 Claims, 7 Drawing Sheets

(56) References Cited

OTHER PUBLICATIONS

Rho et al., "Neural Residual Flow Fields for Efficient Video Representations," 2022. arXiv preprint arXiv:2201.04329 (Year: 2022).*

Kim et al., "Scalable Neural Video Representations with Learnable Positional Features," 36th Conference on Neural Information Processing Systems (NeurIPS 2022), 2022, Total 14 pages.

Zhang et al., "Implicit Neural Video Compression," arXiv:2112.11312v1 [cs.LG], Dec. 2021, Total 15 pages.

* cited by examiner

APPARATUS AND METHOD FOR IMPLICIT NEURAL VIDEO REPRESENTATION

CROSS-REFERENCE TO RELATED APPLICATION(S)

This application is based on and claims priority to Korean Patent Application No. 10-2023-0073161, filed on Jun. 7, 2023, in the Korean Intellectual Property Office, the entire disclosure of which is incorporated herein by reference for all purposes.

BACKGROUND

1. Field

The disclosure relates to an apparatus and method for performing implicit neural representations, more particularly, to an apparatus and method for performing implicit neural video representations.

2. Description of Related Art

With the development of information technology, videos are played on various platforms using devices of various specifications (e.g., various output specifications).

As recent video transmission has characteristics of high resolution, high refresh rate, and long length, a total amount of data transmission and memory consumption in a network increases, and as such, there is a need for technology capable of processing various output specifications, such as resolution, frames per second (FPS), and the like according to transmitted videos.

Further, in a video representation method using a matrix including Red-Green-Blue (RGB) values per pixel location in a video, resource requirement (e.g., memory capacity) increases exponentially with the resolution and length of a video, such that videos may not be processed efficiently by the method.

Recently, for efficient video processing, research on implicit neural representation (INR) has been conducted, which is a method for neural representation of data, such as images or videos, in neural networks.

SUMMARY

According to an aspect of the disclosure, there is provided an apparatus including: a first neural network configured to: receive space-time coordinates of a video as an input; and obtain pixel-to-pixel matching information up to a keyframe based on the space-time coordinates of the video; and a second neural network configured to: receive the space-time coordinates of the video and the pixel-to-pixel matching information as an input; and obtain Red-Green-Blue (RGB) data based on the space-time coordinates and the pixel-to-pixel matching information.

The apparatus may further include: a selector configured to: divide a frame of the video into a plurality of groups of pictures (GOPs), and select the keyframe in each of the plurality of GOPs.

The pixel-to-pixel matching information may include an optical flow.

The first neural network may be further configured to be trained based on a plurality of frames in each of the plurality of GOPs and the keyframe in each of the plurality of GOPs, and based on the optical flow.

The second neural network may further include a converter configured to convert the space-time coordinates into spatial coordinates in a keyframe coordinate system based on the pixel-to-pixel matching information.

The converter may be configured to map three-dimensional space-time coordinates to two-dimensional spatial coordinates in the keyframe coordinate system based on the optical flow.

The second neural network may include a shared feature extractor configured to: extract a shared feature from the mapped two-dimensional spatial coordinates in the keyframe, the shared feature being a feature vector shared by all frames in the plurality of GOPs.

The second neural network may include a residual feature extractor configured to extract a residual feature based on the space-time coordinates, the residual feature being different from the shared feature.

The second neural network may include a combiner configured to combine the shared feature and the residual feature.

The second neural network may include an output interface configured to output the RGB data based on the combined feature being input into a decoding network.

According to another aspect of the disclosure, there is provided a method for implicit neural video representation, the method including: receiving, by a first neural network, space-time coordinates of a video as an input; obtaining, by the first neural network, pixel-to-pixel matching information up to a keyframe based on the space-time coordinates of the video; receiving, by a second neural network, the space-time coordinates of the video and the pixel-to-pixel matching information as an input; and obtaining, by the second neural network, Red-Green-Blue (RGB) data based on the space-time coordinates and the output pixel-to-pixel matching information.

The method may include dividing a frame of the video into a plurality of groups of pictures (GOPs), and selecting the keyframe in each of the plurality of GOPs.

The pixel-to-pixel matching information may include an optical flow.

The first neural network is trained based on a plurality of frames in each of the plurality of GOPs and the keyframe in each of the plurality of GOPs, and based on the optical flow.

The outputting of the RGB data may include: converting the space-time coordinates into spatial coordinates in a keyframe coordinate system based on the pixel-to-pixel matching information; extracting a shared feature from the spatial coordinates in the keyframe coordinate system, the shared feature being a feature vector shared by all frames in the plurality of GOPs; extracting a residual feature based on the space-time coordinates, the residual feature being different from the shared feature; combining the shared feature and the residual feature; and outputting the RGB data based on the combined feature being input into a decoding network.

The converting of the space-time coordinates into the spatial coordinates in the keyframe coordinate system may include mapping three-dimensional space-time coordinates to two-dimensional spatial coordinates in the keyframe coordinate system based on the optical flow.

According to another aspect of the disclosure, there is provided a codec device including: a video decoder including: a bitstream decoder configured to decode a bitstream of a video obtained by a video encoder; a first neural network configured to: receive the decoded bitstream as an input; and obtain pixel-to-pixel matching information up to a keyframe based on the decoded bitstream; and a second neural network configured to: receive the decoded bitstream and the pixel-to-pixel matching information as an input; and obtain Red-Green-Blue (RGB) data based on the decoded bitstream and the output pixel-to-pixel matching information as input.

The video decoder may further include: a selector configured to: divide a frame of the video into a plurality of groups of pictures (GOPs), and select the keyframe in each of the plurality of GOPs.

The pixel-to-pixel matching information may be an optical flow.

The second neural network may be configured to convert the decoded bitstream into spatial coordinates in a keyframe coordinate system based on the pixel-to-pixel matching information.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
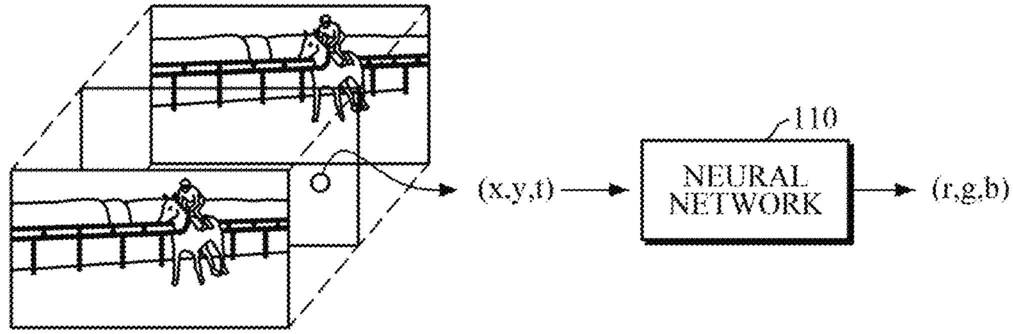
FIG. 1 is a diagram illustrating implicit neural video representation.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all example embodiments are not limited thereto.

The embodiments of the disclosure are example embodiments, and thus, the disclosure is not limited thereto and may be realized in various other forms. As is traditional in the field, embodiments may be described and illustrated in terms of blocks, as shown in the drawings, which carry out a described function or functions. These blocks, which may be referred to herein as "units" or "modules" or the like, or by names such as device, logic, circuit, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

As used herein, an expression "at least one of" preceding a list of elements modifies the entire list of the elements and does not modify the individual elements of the list. For example, an expression, "at least one of a, b, and c" should be understood as including only a, only b, only c, both a and b, both a and c, both b and c, or all of a, b, and c.

FIG. 1 is a diagram illustrating implicit neural video representation.

Referring to FIG. 1, implicit neural video representation refers to representation of video data via a neural network. For example, implicit neural video representation may include outputting coordinates (r, g, b) corresponding to RGB data for specific space-time coordinates (x, y, t) of a video based on a learning process through a neural network 110. That is, the learning process is performed using the neural network to match the specific coordinates on video data with an output value, such that output values may be obtained for various coordinates. Accordingly, videos may be output for various specifications, for example, video super resolution (VSR) and frame rate up conversion (FRUC), based on the output value.

Figure 2A:
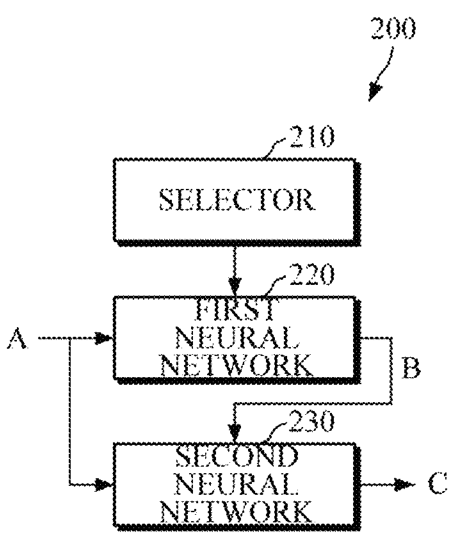
FIG. 2A is a block diagram illustrating an apparatus for implicit neural video representation according to an embodiment of the disclosure.
Figure 2B:
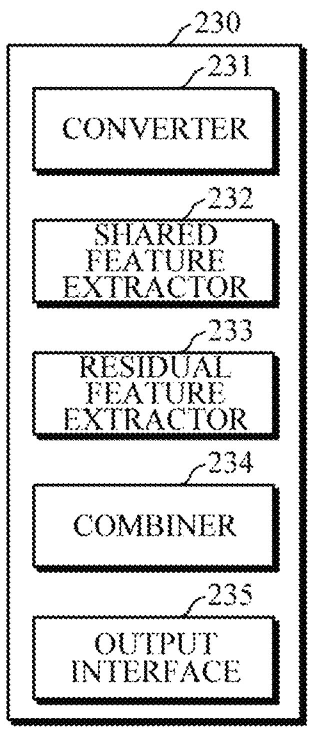
FIG. 2B is a block diagram illustrating a second neural network according to an embodiment of the disclosure.

FIG. 2A is a block diagram illustrating an apparatus for implicit neural video representation according to an embodiment of the disclosure, and FIG. 2B is a block diagram illustrating a second neural network included in an apparatus for implicit neural video representation according to an embodiment of the disclosure.

Referring to FIG. 2A, an apparatus 200 for implicit neural video representation includes a selector 210, a first neural network 220, and a second neural network 230.

The selector 210 may divide the entire frame of a video into groups of pictures (GOP) containing a plurality of frames, and may select a keyframe from each GOP. The term keyframe may also be referred to as "a key frame" or "a target frame" the define a particular location or position in the GOP. According to an example embodiment, the selector 210 may select, as a keyframe, a frame in a specific position of the GOP. For example, the selector 210 may select, as the keyframe, a frame in the middle of the GOP, a frame at the beginning or at the end of the GOP. However, the position of the keyframe selected by the selector 210 is not limited thereto, and as such, the keyframe may be selected from a different position in the GOP.

The first neural network 220 may output pixel-to-pixel matching information up to the keyframe, by using space-time coordinates of a video as input.

According to an embodiment, the pixel-to-pixel matching information refers to information related to matching between pixels contained in different frames. For example, the information may include, but is not limited to, a motion vector or an optical flow. An example embodiment in which the information is an optical flow is described below.

For example, the optical flow is a method of tracking the movement of an object within frames of a sequence of images. The optical flow indicates a motion direction of pixels moving between a first frame and a second frame and distance distribution of the pixels. For example, the first frame may be a current frame and the second frame may be a next frame (e.g., the frame adjacent to the current frame). In an example, the motion of pixels may be expressed as a displacement vector. That is, the optical flow is a vector that shows where the pixels of the current frame are in the next frame. Also, the optical flow may correspond to an algorithm for matching pixels between the current and next frames.

For example, the first neural network 220 may output an optical flow B up to a keyframe, selected by the selector 210, by using space-time coordinates A within a reference frame of a video as input. The reference frame may be a predetermined frame.

In an example, the first neural network 220 may be trained to output the optical flow up to a keyframe for specific space-time coordinates. In an example, the optical flow up to a keyframe, which is actually output as data required for training, may be generated by using, as input, each frame in the GOP and the keyframe matched with each frame, which may be represented by the following Equation 1.

$$OF(I_i, I_{key}) = (\Delta x_i, \Delta y_i, \Delta t_i) \quad \text{[Equation 1]}$$

Figure 3:
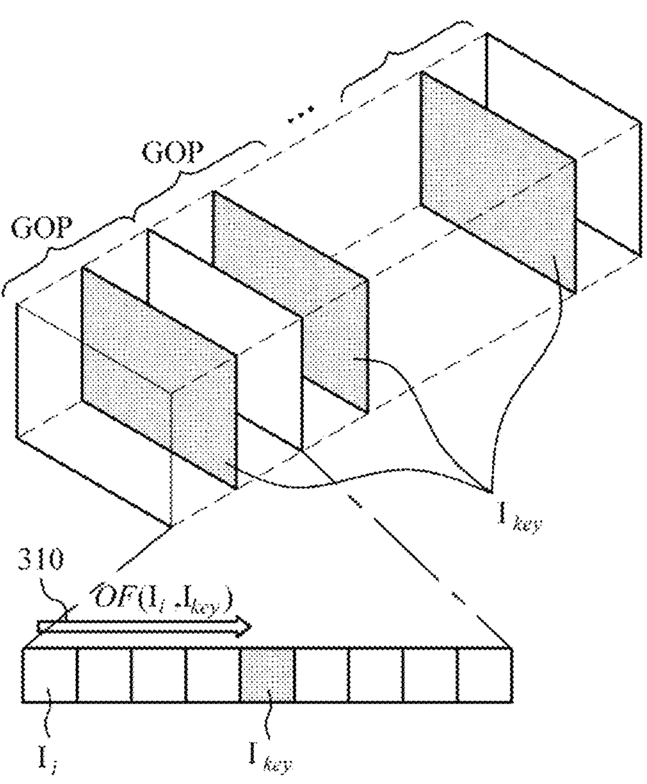
FIG. 3 is a diagram illustrating an optical flow to a keyframe according to an embodiment of the disclosure.

FIG. 3 is a diagram illustrating an optical flow to a keyframe according to an embodiment of the disclosure.

Referring to FIG. 3 and Equation 1, $I_i$ denotes a reference frame in the GOP, $I_{key}$ denotes the keyframe, $OF(I_i, I_{key})$ 310 denotes a function of the optical flow from frame $I_i$ to keyframe $I_{key}$, and $\Delta x_i$, $\Delta y_i$, $\Delta t_i$ denotes an optical flow B to the keyframe for specific space-time coordinates $(x_i, y_i, t_i)$ within frame $I_i$. In an example, in the space-time coordinates $(x_i, y_i, t_i)$, $x_i$ and $y_i$ denote horizontal and vertical coordinates in frame $I_i$, and $t_i$ denotes coordinates on the time axis of a video.

Referring back to FIGS. 2A and 2B, the second neural network 230 may output RGB data by using, as input, the space-time coordinates of a video and the output pixel-to-pixel matching information. For example, the second neural network 230 may output RGB data C by using, as input, the space-time coordinates A of a video and the optical flow B output by the first neural network 220.

In an example, the second neural network 230 includes a converter 231, a shared feature extractor 232, a residual feature extractor 233, a combiner 234, and an output interface 235.

The converter 231 may convert the space-time coordinates into spatial coordinates in a keyframe coordinate system, by using the output pixel-to-pixel matching information. For example, by using the optical flow output by the first neural network 220, the converter 231 may map three-dimensional space-time coordinates to two-dimensional spatial coordinates in the keyframe coordinate system.

According to an embodiment, Equation 2 represents the space-time coordinates in a random frame $I_i$, and the converted space-time coordinates in the keyframe.

$$(x, y, t)_{iframe} = (x + \Delta x_i, y + \Delta y_i, t + \Delta t_i)_{keyframe} \quad \text{[Equation 2]}$$

In an example in which coordinates $(x, y, t)_{iframe}$, which are the space-time coordinates in the random frame $I_i$ contained within the GOP, are moved to the keyframe by using the optical flow, coordinates in the keyframe may be $(x+\Delta x_i, y+\Delta y_i, t+\Delta t_i)_{keyframe}$. In an example, it can be seen that as the value of $t+\Delta t_i$ in the keyframe is the same value for all the space-time coordinates which are moved using the optical flow, the three-dimensional space-time coordinates (x, y, t) are mapped to two-dimensional spatial coordinates in the keyframe.

The shared feature extractor 232 may extract a shared feature, which is a feature vector shared by all the frames in the GOP, from the mapped two-dimensional spatial coordinates in the keyframe. All the space-time coordinates in the GOP may be mapped to the two-dimensional spatial coordinates in the keyframe by using the optical flow, and the shared feature extractor 232 may extract, e.g., a shared feature, which is a feature vector shared by all the frames in the GOP and representing a feature of a moving object, from the mapped coordinates. By mapping the coordinates, the pixels in a three-dimensional space are clustered in the two-dimensional space, such that the shared feature extractor 232 may rapidly extract the shared feature in the two-dimensional space. In addition, the optical flow generally exists not at an integer portion but at a real number portion of the coordinates, such that the shared feature extractor 232 may also extract the shared feature for the real number portion of the two-dimensional coordinates, which is advantageous for achieving spatio super-resolution.

The residual feature extractor 233 may extract a residual feature, other than the share feature, by using the space-time coordinates. In an example in which the shared feature is extracted by using the optical flow to the keyframe, actual frame information may not be represented sufficiently due to a brightness change, occlusion, and the like. Accordingly, by using the space-time coordinates as input, the residual feature extractor 233 may extract a residual feature for each frame, as a feature other than the shared feature.

The combiner 234 may combine the extracted shared feature and residual feature. The combiner 234 may combine the shared feature and the residual feature by using a transformer and the like, and by adding, for example, a shared feature having a size of 128×1 and a residual feature having a size of 128×1, the combiner 234 may combine the features to a feature of 256×1. The method of combining the shared feature and the residual feature by the combiner 234 is not limited thereto.

The output interface 235 may output RGB data through a decoding network. For example, the output interface 235 may finally output RGB data by using the feature, combined by the combiner 234, as an input of a decoding network using various modulation techniques.

Recently, videos transmitted and received by electronic devices require high specifications of high resolution, high refresh rate, and large capacity, such that there is a need for improving technology for processing the videos. By using the pixel-to-pixel matching information in combination with the implicit neural representation of videos according to the embodiments of the disclosure, dynamic properties in space-time may be represented effectively by minimizing redundant information between consecutive images, and as a result, videos may be output for various specifications, and efficient video compression and transmission may be provided.

Figure 4:
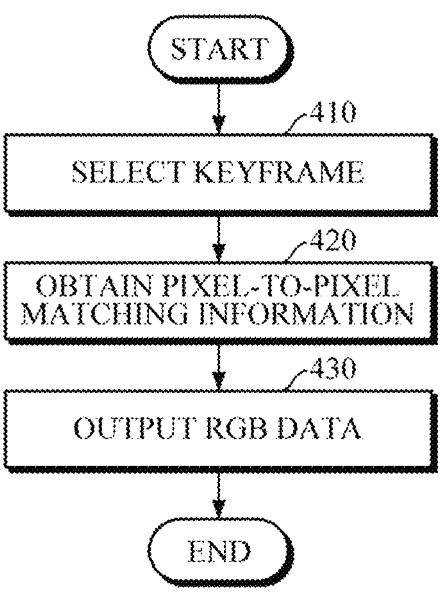
FIG. 4 is a flowchart illustrating a method for implicit neural video representation according to an embodiment of the disclosure.

FIG. 4 is a flowchart illustrating a method for implicit neural video representation according to an embodiment of the disclosure. The method of FIG. 4 is an example of a method for implicit neural video representation performed by the apparatus 200 for implicit neural video representation of FIGS. 2A and 2B, which is described in detail above, and thus will be briefly described below in order to avoid redundancy.

Referring to FIG. 4, in operation 410, the method may include selecting a keyframe. For example, the method may include dividing an entire frame of a video into groups of pictures (GOP) and selecting a keyframe from each of the GOPs. For example, the apparatus for implicit neural video representation may divide the entire frame of a video into groups of pictures (GOP) and may select a keyframe from each GOP.

In operation 420, the method may include obtaining, and may output pixel-to-pixel matching information up to the keyframe by using space-time coordinates of a video as input. For example, the apparatus may obtain the pixel-to-pixel matching information up to the keyframe by using the space-time coordinates of the video as input, and output the pixel-to-pixel matching information. In an example, the pixel-to-pixel matching information may include an optical flow, which is a method of tracking the movement of an object within frames of a sequence of images. In addition, in order to output the pixel-to-pixel matching information, the apparatus for implicit neural video representation may be trained by using, as input, each frame in the GOP and the keyframe matched with each frame.

In operation 403, the method may include outputting Red-Green-Blue (RGB) data based on the space-time coordinates and the pixel-to-pixel matching information. For example, the apparatus for implicit neural video representation may output Red-Green-Blue (RGB) data by using as input, the space-time coordinates and the output pixel-to-pixel matching information.

Figure 5:
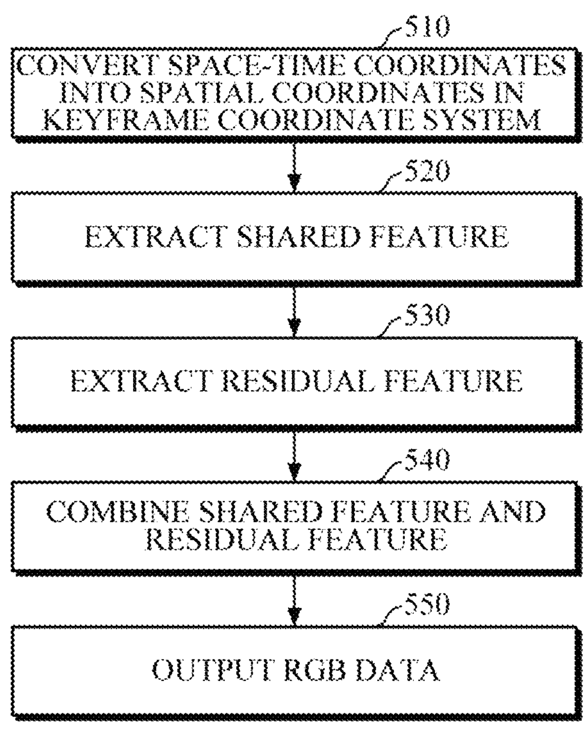
FIG. 5 is a flowchart illustrating an operation of outputting RGB data according to an embodiment of the disclosure.

FIG. 5 is a flowchart illustrating an operation of outputting RGB data according to an embodiment of the disclosure.

Referring to FIG. 5, in operation 510, the method may include converting the space-time coordinates into spatial coordinates in a keyframe coordinate system based on the output pixel-to-pixel matching information. For example, the apparatus for implicit neural video representation may first convert space-time coordinates into spatial coordinates in a keyframe coordinate system, by using the output pixel-to-pixel matching information. In an example, by using the optical flow, the apparatus for implicit neural video representation may map three-dimensional space-time coordinates to two-dimensional spatial coordinates in the keyframe coordinate system.

In operation 520, the method may include extracting a shared feature, which is a feature vector shared by all the frames in the GOP, from the spatial coordinates in the keyframe system. For example, the apparatus for implicit neural video representation may extract a shared feature, which is a feature vector shared by all the frames in the GOP, from the spatial coordinates in the keyframe system. In an example, all the space-time coordinates in the GOP may be mapped to the two-dimensional spatial coordinates in the keyframe by using the optical flow, and the shared feature extractor 232 may extract a shared feature. For example, the shared feature may be a feature vector shared by all the frames in the GOP and representing a feature of a moving object, from the mapped coordinates.

In operation 530, the method may include extracting a residual feature, other than the share feature, by using the space-time coordinates, For example, the apparatus for implicit neural video representation may extract a residual feature, other than the share feature, by using the space-time coordinates. In an example in which the shared feature is extracted by using the optical flow to the keyframe, actual frame information may not be represented sufficiently due to a factor, such as brightness change, occlusion, etc. Accordingly, by using the space-time coordinates as input, the apparatus for implicit neural video representation may extract a residual feature for each frame, as a feature other than the shared feature.

In operation 540, the method may include combining the extracted shared feature and residual feature. For example, the apparatus for implicit neural video representation may combine the extracted shared feature and residual feature. In operation 550, the method may include outputting RGB data by using the combined feature as an input of a decoding network in 550. For example, the apparatus for implicit neural video representation may output RGB data by using the combined feature as an input of a decoding network. According to an example embodiment, the apparatus for implicit neural video representation may combine the shared feature and the residual feature by using a transformer and the like, and may finally output RGB data by using the combined feature as an input of a decoding network using various modulation techniques.

According to another embodiment of the disclosure, the apparatus for implicit neural video representation may also be used as a video codec device.

Figure 6:
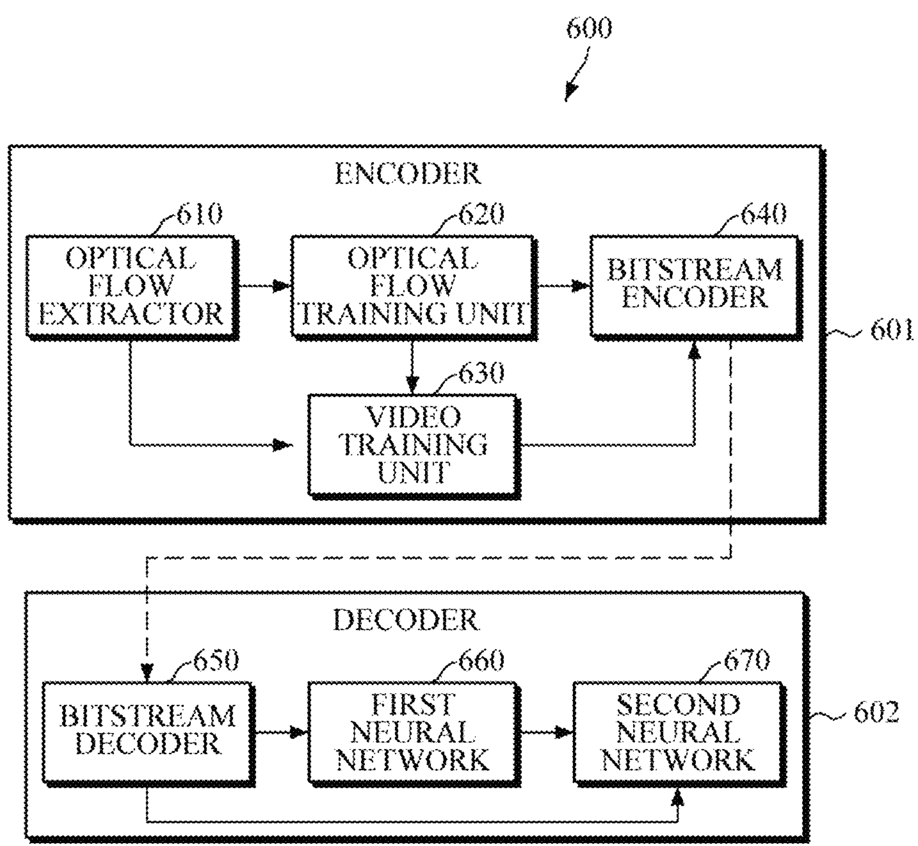
FIG. 6 is a block diagram illustrating a video codec device using implicit neural video representation.

FIG. 6 is a block diagram illustrating a video codec device using implicit neural video representation.

Referring to FIG. 6, a video codec device 600 includes a video encoder 601 and a video decoder 602.

The video encoder 601 includes an optical flow extractor 610, an optical flow training unit 620, a video training unit 630, and a bitstream encoder 640.

The optical flow extractor 610 may extract an optical flow between each frame and a keyframe in the GOP. In an example, the optical flow may be extracted by using various methods, such as computer vision, neural networks, and the like.

The optical flow training unit 620 may train a network that uses space-time coordinates as input and the extracted optical flow as output. In an example, entropy modeling may be used to increase compression efficiency, but the present disclosure is not limited thereto.

The video training unit 630 may train a network that uses space-time coordinates as input and pixel values (r, g, b), corresponding to space-time coordinates of a video, as output. In an example, the network may be trained by using the optical flow output from the optical flow training unit 620.

The bitstream encoder 640 may convert output values of the optical flow training unit 620 and the video training unit 630 into a bitstream by using entropy coding, and may transmit the bitstream.

The video decoder 602 includes a bitstream decoder 650, a first neural network 660, and a second neural network 670. In an example, the video decoder may include a selector configured to divide the entire frame of a video into groups of pictures (GOP) and may select a keyframe from each GOP.

The bitstream decoder 650 may decode the transmitted bitstream by using entropy decoding.

The first neural network 660 may output pixel-to-pixel matching information, e.g., optical flow, by using the decoded bitstream as input.

The second neural network 670 may output RGB data by using the decoded bitstream and the output optical flow as output. In an example, by using the output optical flow, the second neural network 670 may convert the decoded bitstream into spatial coordinates in a keyframe coordinate system.

Embodiments of the disclosure can be realized as a computer-readable code written on a non-transitory computer-readable recording medium. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner. Functional programs, codes, and code segments needed for realizing the aspects disclosure can be readily inferred by programmers of ordinary skill in the art to which the invention pertains.

Although certain example embodiments of the disclosure have been described herein, it will be understood by those skilled in the art that various changes and modifications can be made without changing technical conception and essential features of the disclosure. Thus, it is clear that the above-described embodiments are illustrative in all aspects and are not intended to limit the disclosure.

What is claimed is:

1. An apparatus comprising:

a first neural network configured to:

receive space-time coordinates of a video as an input; and obtain pixel-to-pixel matching information up to a keyframe based on the space-time coordinates of the video; and a second neural network configured to:

receive the space-time coordinates of the video and the pixel-to-pixel matching information as an input; and obtain Red-Green-Blue (RGB) data based on the space-time coordinates and the pixel-to-pixel matching information, wherein the second neural network comprises;

a converter configured to convert the space-time coordinates into spatial coordinates in a keyframe coordinate system based on the pixel-to-pixel matching information; and a shared feature extractor configured to extract, from the spatial coordinates in the keyframe coordinate system, a shared feature shared by all frames in a group of pictures (GOP) including the keyframe.

2. The apparatus of claim 1, further comprising:

a selector configured to:

divide a frame of the video into a plurality of groups of pictures (GOPs), and select the keyframe in each of the plurality of GOPs.

3. The apparatus of claim 1, wherein the pixel-to-pixel matching information comprises an optical flow.

4. The apparatus of claim 3, wherein the first neural network is further configured to be trained based on a plurality of frames in each of a plurality of GOPs and the keyframe in each of the plurality of GOPs, and based on the optical flow.

5. The apparatus of claim 3, wherein the converter is configured to map three-dimensional space-time coordinates to two-dimensional spatial coordinates in the keyframe coordinate system based on the optical flow.

6. The apparatus of claim 5, wherein the second neural network comprises the shared feature extractor configured to:

extract a shared feature from the mapped two-dimensional spatial coordinates in the keyframe, the shared feature being a feature vector shared by all frames in a plurality of GOPs.

7. The apparatus of claim 6, wherein the second neural network comprises a residual feature extractor configured to extract a residual feature based on the space-time coordinates, the residual feature being different from the shared feature.

8. The apparatus of claim 7, wherein the second neural network comprises a combiner configured to combine the shared feature and the residual feature.

9. The apparatus of claim 8, wherein the second neural network comprises an output interface configured to output the RGB data based on the combined feature from the combiner being input into a decoding network.

10. A method for implicit neural video representation, the method comprising:

receiving, by a first neural network, space-time coordinates of a video as an input;

obtaining, by the first neural network, pixel-to-pixel matching information up to a keyframe based on the space-time coordinates of the video;

receiving, by a second neural network, the space-time coordinates of the video and the pixel-to-pixel matching information as an input; and obtaining, by the second neural network, Red-Green-Blue (RGB) data based on the space-time coordinates and the pixel-to-pixel matching information, by converting the space-time coordinates into spatial coordinates in a keyframe coordinate system based on the pixel-to-pixel matching information, and extracting, from the spatial coordinates in the keyframe coordinate system, a shared feature shared by all frames in a group of pictures (GOP) including the keyframe.

11. The method of claim 10, further comprising:

dividing a frame of the video into a plurality of groups of pictures (GOPs), and selecting the keyframe in each of the plurality of GOPs.

12. The method of claim 10, wherein the pixel-to-pixel matching information comprises an optical flow.

13. The method of claim 12, wherein the first neural network is trained based on a plurality of frames in each of a plurality of GOPs and the keyframe in each of the plurality of GOPs, and based on the optical flow.

14. The method of claim 12, further comprising:
extracting the shared feature from the spatial coordinates in the keyframe coordinate system, the shared feature being a feature vector shared by all frames in a plurality of GOPs;
extracting a residual feature based on the space-time coordinates, the residual feature being different from the shared feature;
combining the shared feature and the residual feature; and
outputting the RGB data based on the combined feature being input into a decoding network.

15. The method of claim 14, wherein the converting of the space-time coordinates into the spatial coordinates in the keyframe coordinate system comprises mapping three-dimensional space-time coordinates to two-dimensional spatial coordinates in the keyframe coordinate system based on the optical flow.

16. A codec device comprising:
a video decoder comprising:
a bitstream decoder configured to decode a bitstream of a video obtained by a video encoder;
a first neural network configured to:
receive the decoded bitstream as an input; and
obtain pixel-to-pixel matching information up to a keyframe based on the decoded bitstream; and
a second neural network configured to:
receive the decoded bitstream and the pixel-to-pixel matching information as an input; and
obtain Red-Green-Blue (RGB) data based on the decoded bitstream and the pixel-to-pixel matching information as input,
wherein the second neural network is configured to convert the decoded bitstream into spatial coordinates in a keyframe coordinate system based on the pixel-to-pixel matching information, and extract, from the spatial coordinates in the keyframe coordinate system, a shared feature shared by all frames in a group of pictures (GOP) including the keyframe.

17. The codec device of claim 16, wherein the video decoder further comprises:
a selector configured to:
divide a frame of the video into a plurality of groups of pictures (GOPs), and
select the keyframe in each of the plurality of GOPs.

18. The codec device of claim 17, wherein the pixel-to-pixel matching information comprises an optical flow.

* * * * *